United States Patent
Prasad et al.

(10) Patent No.: US 9,407,668 B2
(45) Date of Patent: Aug. 2, 2016

(54) PROTECTION AGAINST UNSOLICITED COMMUNICATION FOR INTERNET PROTOCOL MULTIMEDIA SUBSYSTEM

(75) Inventors: Anand Raghawa Prasad, Tokyo (JP); Andreas Kunz, Heidelberg (DE); Toshiyuki Tamura, Tokyo (JP); Stefan Schmid, Heidelberg (DE); Thilo Ewald, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 795 days.

(21) Appl. No.: 13/122,262

(22) PCT Filed: Oct. 6, 2009

(86) PCT No.: PCT/JP2009/067817
§ 371 (c)(1),
(2), (4) Date: Aug. 3, 2011

(87) PCT Pub. No.: WO2010/041761
PCT Pub. Date: Apr. 15, 2010

(65) Prior Publication Data
US 2011/0286394 A1 Nov. 24, 2011

(30) Foreign Application Priority Data
Oct. 6, 2008 (JP) .............................. P2008-260088

(51) Int. Cl.
*H04L 29/06* (2006.01)
*H04M 3/436* (2006.01)

(52) U.S. Cl.
CPC ........ *H04L 65/1016* (2013.01); *H04L 65/1006* (2013.01); *H04L 65/1079* (2013.01); *H04M 3/436* (2013.01)

(58) Field of Classification Search
CPC ............... H04M 3/436; H04L 65/1016; H04L 65/1079; H04L 65/1006
USPC .......................................................... 709/200
See application file for complete search history.

(56) References Cited

U.S. PATENT DOCUMENTS

| | | | |
|---|---|---|---|
| 7,532,890 B2 * | 5/2009 | Davies | H04L 12/587 370/395.5 |
| 7,822,188 B1 * | 10/2010 | Kirchhoff | H04M 3/436 379/211.02 |

(Continued)

FOREIGN PATENT DOCUMENTS

| | | |
|---|---|---|
| EP | 1742452 A | 1/2007 |
| JP | 2005-5927 A | 1/2005 |

(Continued)

OTHER PUBLICATIONS

International Search Report for PCT/JP2009/067817 mailed Dec. 22, 2009.

(Continued)

*Primary Examiner* — Patrice Winder
*Assistant Examiner* — Angela Widhalm de Rodrig (57) ABSTRACT

A protection against an unsolicited communication for an IMS (PUCI) system includes a call session control function (CSCF), and a plurality of PUCE application servers. The PUCI application servers make an evaluation as to whether a communication received from the user equipment is an unsolicited communication; the CSCF makes a decision on routing toward the PUCI application servers based on the evaluation; then, the PUCI application servers execute the routing based on the decision.

3 Claims, 5 Drawing Sheets

(56) References Cited

U.S. PATENT DOCUMENTS

| | | | |
|---|---|---|---|
| 8,645,524 B2 * | 2/2014 | Pearson | H04L 29/12264 370/389 |
| 9,219,686 B2 * | 12/2015 | Hilt | H04L 47/10 |
| 2007/0150276 A1 * | 6/2007 | Srivastava | H04L 12/585 704/246 |
| 2007/0150773 A1 * | 6/2007 | Srivastava | 714/49 |
| 2009/0077616 A1 * | 3/2009 | Lindholm | H04L 63/20 726/1 |
| 2010/0226261 A1 * | 9/2010 | Piche | H04L 12/585 370/252 |

FOREIGN PATENT DOCUMENTS

| | | |
|---|---|---|
| JP | 2006-60811 A | 3/2006 |
| JP | 2007527633 A | 9/2007 |
| WO | 2006/108989 A2 | 10/2006 |
| WO | 2009/024169 A1 | 2/2009 |

OTHER PUBLICATIONS

D. Waiting et al., "The Threat of Unsolicited Sessions in the 3GPP IP Multimedia Subsystem", IEEE Communications Magazine, vol. 45, No. 7, Jul. 2007, pp. 100-106.

S. M. A. Salehin et al., "Blocking Unsolicited Voice Calls Using Decoys for the IMS", ICC 2007 proceedings, 2007, pp. 1961-1966.

3GPP TR 33.cde V0.1.0, 3rd Generation Partnership Project: Technical Specification Group Services and System Aspects; Study of Mechanisms for Protection against Unsolicited Communication for IMS (PUCI) (Release 9), Nov. 2008.

Japanese Office Action for JP Application No. 2011-514919 mailed on Sep. 3, 2013 with English Translation.

* cited by examiner

PROTECTION AGAINST UNSOLICITED COMMUNICATION FOR INTERNET PROTOCOL MULTIMEDIA SUBSYSTEM

TECHNICAL FIELD

The present invention relates to the protection against unsolicited communication for Internet protocol multimedia subsystems.

The present application claims priority based on Japanese Patent Application No. 2008-260088, the content of which is incorporated herein by reference.

BACKGROUND ART

The recent stream of telecommunication has led to IP (Internet Protocol) standardization on audio communication systems representative of telephone networks. The 3GPP (3rd Generation Partnership Project), which is the working group on the standardization of mobile communications, drafted the specification for the standardization of the IP multimedia subsystem (IMS) serving as the platform for providing multimedia services such as audio services on the IP network. Recently, assessments have been carried out with respect to the fixed-type IP standardization on the next generation network (NGN).

Electronic mailing services have suffered from social problems such as Spam and unsolicited (or junk) mails, which are unwanted mails unilaterally sent to recipients by senders. Unsolicited communications occur due to various factors derived from the popularization of the Internet, such as significant decreases of communication costs and advanced capabilities of network access terminals (such as personal computers purchasable by common users) transmitting numerous electronic mails to unspecified persons or sites.

The above problem (already occurring in electronic mailing services) seems to occur in the IMS due to its popularization. The 3GPP specification has initiated the protection against unsolicited communication for EMS (simply referred to as "PUCI") to protect users from Spam over the IP telephony (SPIT). In this connection, Patent Document 1 discloses a mobile network system having IMS entities.

Patent Document 1: Japanese Patent Application Publication No. 2007-527633

The 3GPP just started the assessment on the PUCI for the IMS. Subscriber originating calls are each subjected to testing by way of PUCI applications, which in turn evaluate calls with unsolicited rating scores. Unsolicited calls are rejected (or declined) but calls which are not regarded as unsolicited calls are forwarded to the user equipment. Herein, the problem is how the IMS involves the PUCI application for checking scores.

DISCLOSURE OF INVENTION

To solve the above problem, two alternative solutions are demonstrated below.
(1) The serving call session control function (S-CSCF) is enhanced to provide a dispatching functionality.
(2) The PUCI application is enhanced to enable the distributed processing for making next-hop routing decisions, in which the PUCI application needs to autonomously determine whether to perform a PUCI test/stage on a next call.

The conventional IMS specification adopting the initial filter criteria (iFC) accepts only the static routing on application servers and is limited to the dynamic application server (AS) assignment based on the digital subscriber network (DSN). This requires the IMS to be enhanced in providing an adequate flexibility for handling the PUCI.

The present invention seeks to solve the above problem, wherein the object thereof is to expand functions of the IMS by way of enhancing the S-CSCF or implementing a new routing logic to an application server.

Specifically, a protection against an unsolicited communication for an IMS (PUCI) system includes a call session control function (CSCF), and a plurality of PUCI application servers. The PUCI application servers make an evaluation as to whether a communication received from the user equipment is an unsolicited communication; the CSCF makes a decision on routing toward the PUCI application servers based on the evaluation; then, the PUCI application servers execute the routing based on the decision.

According to Solution 1, the PUCI system implements the processing comprising: forwarding an INVITE from the user equipment to the CSCF; executing a PUCI service in the CSCF; forwarding the INVITE in light of an initial filter criteria (iFC) from the CSCF to a first PUCI application server; executing a PUCI Test 1 in the first PUCI application server, thus producing the result indicating a probability of occurrence of an unsolicited call; sending back the INVITE including the result of the PUCI Test 1 from the first PUCI application server to the CSCF; evaluating the result so as to forward the INVITE to a second PUCI application server suitable for further testing; executing a PUCI Test 2 in the second PUCI application server, thus producing the result indicating a further probability of the occurrence of the unsolicited call; sending back the INVITE including the result of the PUCI Test 2 from the second PUCI application server to the CSCF; and evaluating both the results so as to reject the unsolicited call.

According to Solution 2, the PUCI system implements the processing comprising: forwarding an INVITE from the user equipment to the CSCF; executing a PUCI service in the CSCF; forwarding the INVITE in light of an initial filter criteria (iFC) from the CSCF to a first PUCI application server; executing a PUCI Test 1 in the first PUCI application server, thus producing the result indicating a probability of occurrence of an unsolicited call; evaluating the result so as to determine a second PUCI application server suitable for further testing; sending back the INVITE including the result destined to the second PUCI application server from the first PUCI application server to the CSCF; forwarding the INVITE to the second PUCI application server from the CSCF to the second PUCI application server; executing a PUCI Test 2 in the second PUCI application server, thus producing the result indicating a further probability of the occurrence of the unsolicited call; evaluating the result so as to route the unsolicited call to a terminating party or to send back the INVITE including the result indicating no probability of the occurrence of the unsolicited call to the CSCF.

BEST MODE FOR CARRYING OUT THE INVENTION

The present invention refers to dynamic routing decisions on unsolicited calls using a plurality of PUCI application servers by way of two methods, i.e. a first method for executing dynamic routing in the serving call session control function (S-CSCF) or a second method for executing dynamic routing in the PUCI application server. Herein, dynamic routing decisions are made in either the S-CSCF or the PUCI application server based on results of PUCI testing and scores of testing.

Specifically, the present invention demonstrates the following technical features.

(1) The S-CSCF is enhanced to perform dynamic routing toward PUCI application servers based on the special PUCI information added to signaling messages (e.g. IMS/SIP headers, where SIP stands for Signal Initiated Protocol) or by way of out-of-band signaling between the S-CSCF and the PUCI application server.

(2) The PUCI application server is designed to have a dynamic call routing capability based on the special PUCI information included in the signaling messages (e.g. IMS/SIP headers).

Figure 1:
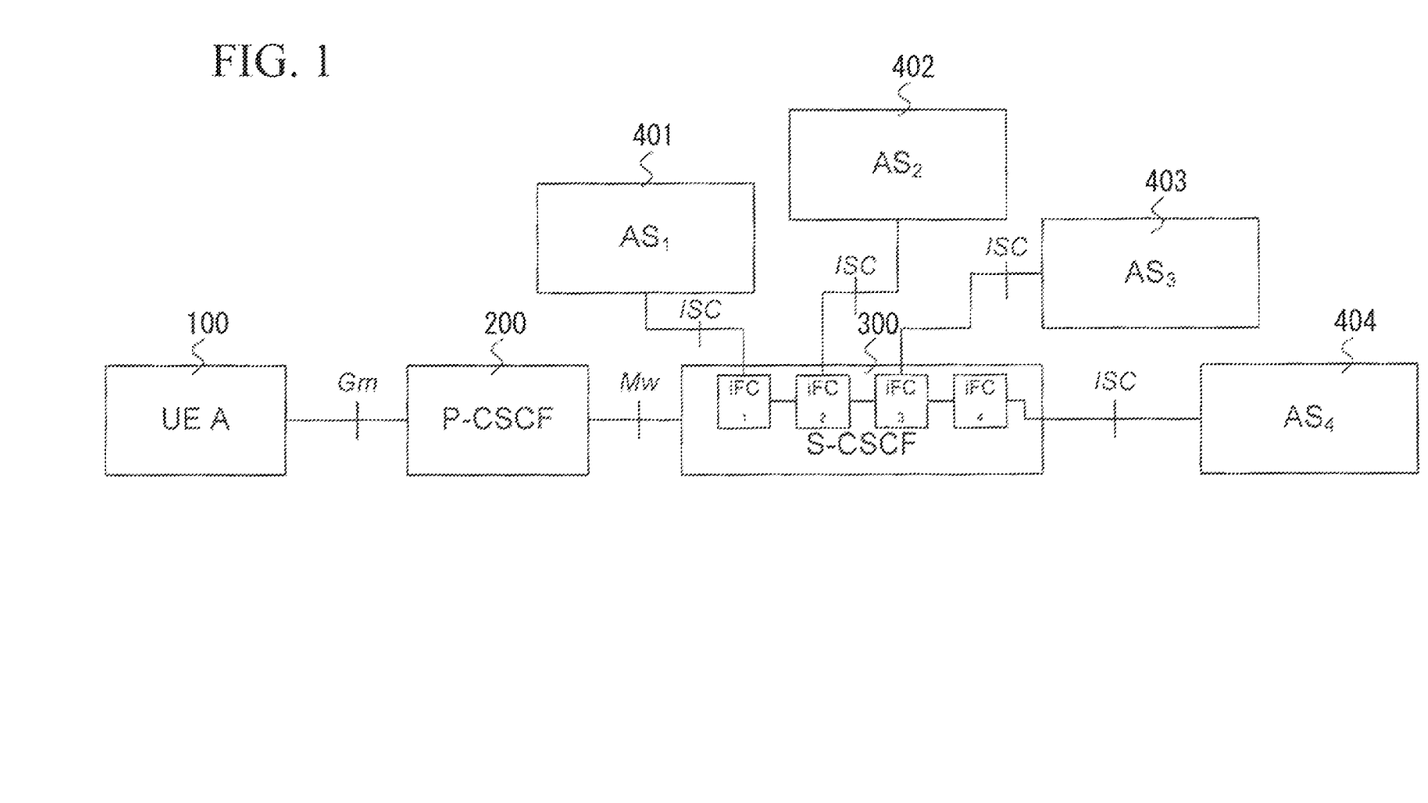
FIG. 1 is a block diagram showing the constitution for the protection against unsolicited communication for an Internet protocol multimedia subsystem, i.e. a PUCI system.

FIG. 1 is a block diagram showing the constitution of a PUCI system, i.e. a system for the protection against unsolicited communication for the IMS, which is constituted of user equipment (UE A) 100 for originating calls, a proxy call session control function (P-CSCF) 200 for transferring calls originated by the user equipment 100 to destinations, a serving call session control function (S-CSCF) 300 requesting application servers to make decisions as to whether or not transferred calls are regarded as unsolicited calls, and a plurality of application servers ($AS_1$ to $AS_4$) 401 to 404 for making decisions on unsolicited calls.

The 3GPP is the project regarding the third generation cellular phone system for preparing specifications on an extended network implementing wideband code division multiple access (W-CDMA) and a global system for mobile communications (GMS), and it recently started studying the PUCI system which is implemented by use of one PUCI application or by use of plural PUCI applications. Herein, the PUCI application tests a session regarding each subscriber call so as to check whether or not each subscriber call is regarded as a potentially unsolicited call. There are various methods and standards enabling PUCI applications to classify sessions into potentially unsolicited calls by way of various stages, wherein PUCI applications evaluate calls with unsolicited rating scores, which are sequentially accumulated. In this connection, the PUCI application is capable of sending the session signaling including the detailed information of the PUCI testing to the next PUCI application or the S-CSCF 300 (i.e. the IMS for designating the next PUCI application).

Calls which pass through various stages of the PUCI testing are finally regarded as solicited calls (which are not unsolicited calls) and then transferred to the user equipment (UE), while other calls are rejected. The PUCI application or the IMS handles a rejected session by way of three procedures, i.e. (i) to silently discard the rejected session, (ii) to gracefully terminate the rejected session by transmitting an ERROR or BYE message, and (iii) to present an explicit indication including a reason for rejection to a source entity.

Specific ideas are presented with respect to the following information elements (which are transmitted to a source entity, e.g. the user equipment 100 sending unsolicited calls) included in a REJECT message, and a method how to use them.

(1) The name of the PUCI application, which is used to presume the result and the type of testing to be carried out.

(2) The testing result of the PUCI application, which is produced by way of specific testing.

(3) The signature of the PUCI application, which is used to validate the testing and to access the testing history.

(4) The cumulative PUCI score and a list of PUCI applications.

(5) Indication whether or not each session passes through the PUCI testing, which is used to prevent the SIP terminal adaptation from easily occurring.

(6) The signature of a legal entity which carries out the testing, which is used to validate the testing.

Since the user equipment (UE) is designed to finally terminate calls when the operator has no legal right to block calls on behalf of the end-user, the above information is added to a REJECT message by way of a PUCI application/function included in the UE which may finally block calls or by way of the PUCI application server or the IMS which is involved in the processing of a SIP BYE message or an ERROR message.

The 3GPP suffers from a problem in which when the IMS is designed to support several potentially independent PUCI application servers, the IMS needs to achieve the dynamic PVCI routing functionality, or each PUCI application server needs to autonomously route each session to the next PUCI application.

In addition, the present IMS specification may demonstrate a routing logic involving several application servers based on the initial filter criteria (iFC); however, this solution merely achieves static routing toward application servers based on the simple filter criteria.

Besides, the present IMS specification may ensure the dynamic application server assignment based on the DSN name; however, this solution is merely beneficial for the load balancing purpose.

In order to chain several PUCI application servers in a dynamic way based on the PUCE specification, the present invention provides the following solutions.

(1) The S-CSCF of the IMS is enhanced to secure dynamic routing toward the PUCI application servers based on the special PUCI information added to signaling messages (e.g. IMS/SIP headers) or by way of out-of-band signaling between the S-CSCF and the PUCI application server.

(2) The PUCI application server is designed to have a dynamic call routing capability based on the special PUCI information included in the IMS/SIP signaling.

1. Embodiment 1 (or Solution 1 Implementing the Enhancement of IMS/S-CSCF)

Figure 2:
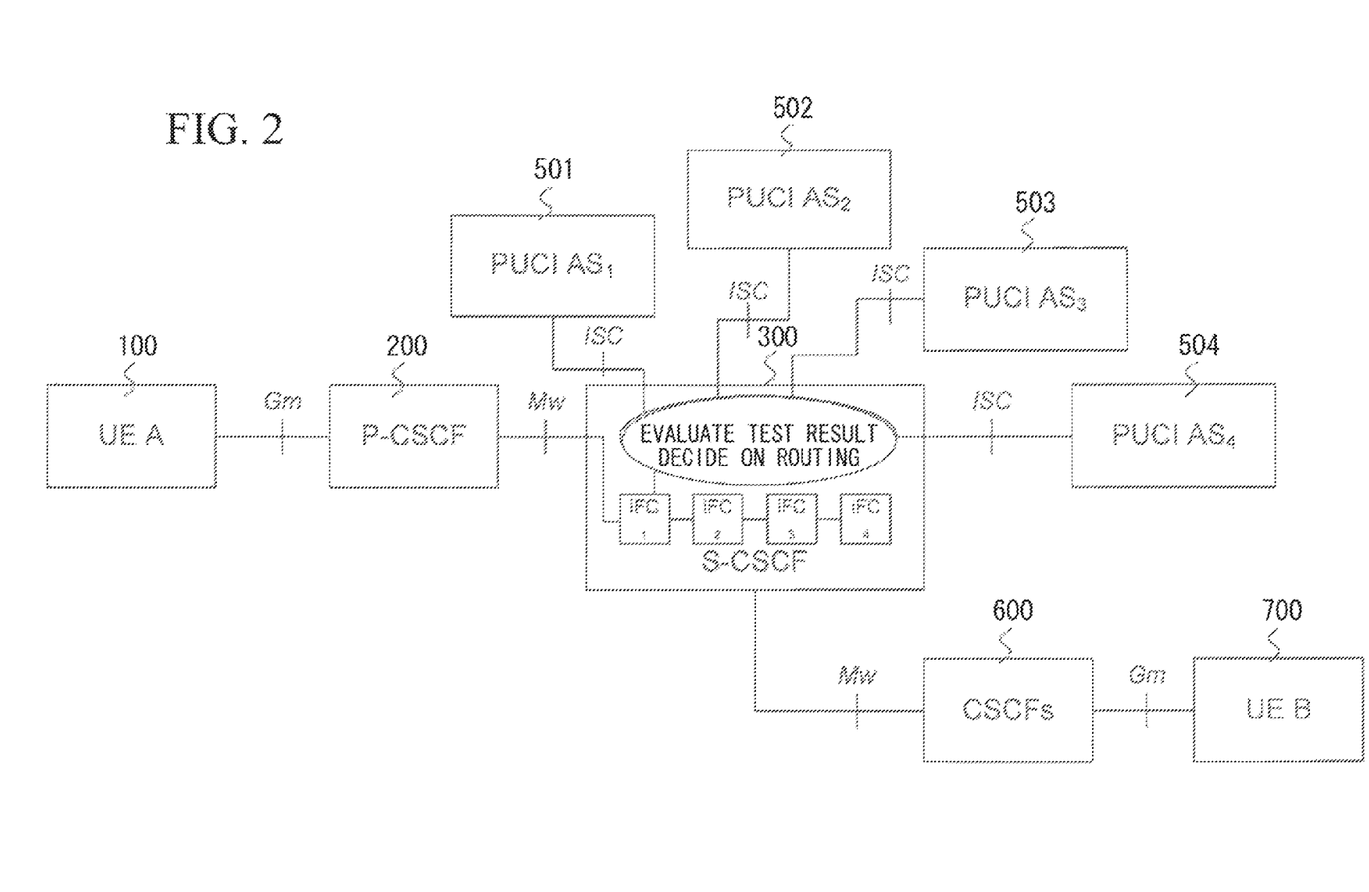
FIG. 2 is a block diagram showing the constitution of a PUCI system according to Embodiment 1.

FIG. 2 is a block diagram showing the constitution of a PUCI system according to Embodiment 1, which includes the user equipment (UE A) 100 for originating calls, the proxy call session control function (P-CSCF) 200 for transferring calls originated by the user equipment 100 to destinations, the serving call session control function (S-CSCF) 200 requesting application servers to make decisions as to whether or not transferred calls are regarded as unsolicited calls, and a plurality of application servers (PUCI $AS_1$ to PUCI $AS_4$) 501 to 504 for making decisions on unsolicited calls by way of various stages. The PUCI system of FIG. 2 further includes a call session control function (CSCF) 600 for transferring calls to destinations, and user equipment (UE B) 700 serving as one destination.

Solution 1 implements a new PUCI-aware routing logic to the IMS/S-CSCF, which evaluates previous PUCI testing results included in either session signaling headers or out-of-band IMS service control (ISC), thus making a decision as to which PUCI application is to operate next or whether to reject sessions.

Solution 1 refers to the following information elements included in IMS/SIP signaling headers or out-of-band ISC (which should be used for further processing based on a routing logic).
(1) The name of the PUCI application (which is used to presume the testing result).
(2) The indication as to whether or not each session passes through the PUCI testing.
(3) The detailed result of the PUCI application testing.
(4) The signature of the PUCI application, which is used to validate the testing to be carried out.
(5) The cumulative PUCI score and a list of PUCI applications.

In addition, Solution 1 refers to the following ideas on the routing logic (or the routing logic module).
(1) The routing logic decides based on the cumulative PUCI score.
(2) The routing logic decides based on a weighted cumulative PUCI score, wherein the operator can configure different weights on the PUCI applications.
(3) The weights are determined based on the PUCI applications and/or the legal entity carrying out the testing.
(4) The routing logic decides based on the detailed result of the last PUCI testing.
(5) The routing logic decides by way of the analysis on all detailed results of previous PUCI testing.
(6) The routing logic module decides based on a program which is flexibly/dynamically extended/replaced (by way of upgrading the fly).
(7) The routing logic module decides based on a pattern matching algorithm.
(8) The routing logic utilizes a self-learning strategy, wherein upon the installation of a new PUCI application, the routing logic learns how to interpret the results based on the explicit user feedback, the results of other PUCI applications and/or call patterns (which are used to presume whether or not calls are solicited), and the detailed PUCI application outputs.
(9) The routing logic evaluates whether or not the testing is already carried out to avoid double triggering by the same application server.

The new PUCI routing logic should be invoked prior to the execution of the standard initial filter criteria, since the PUCI feature likely makes a decision to reject sessions so that the processing of various application servers will be wasted.

Figure 3:
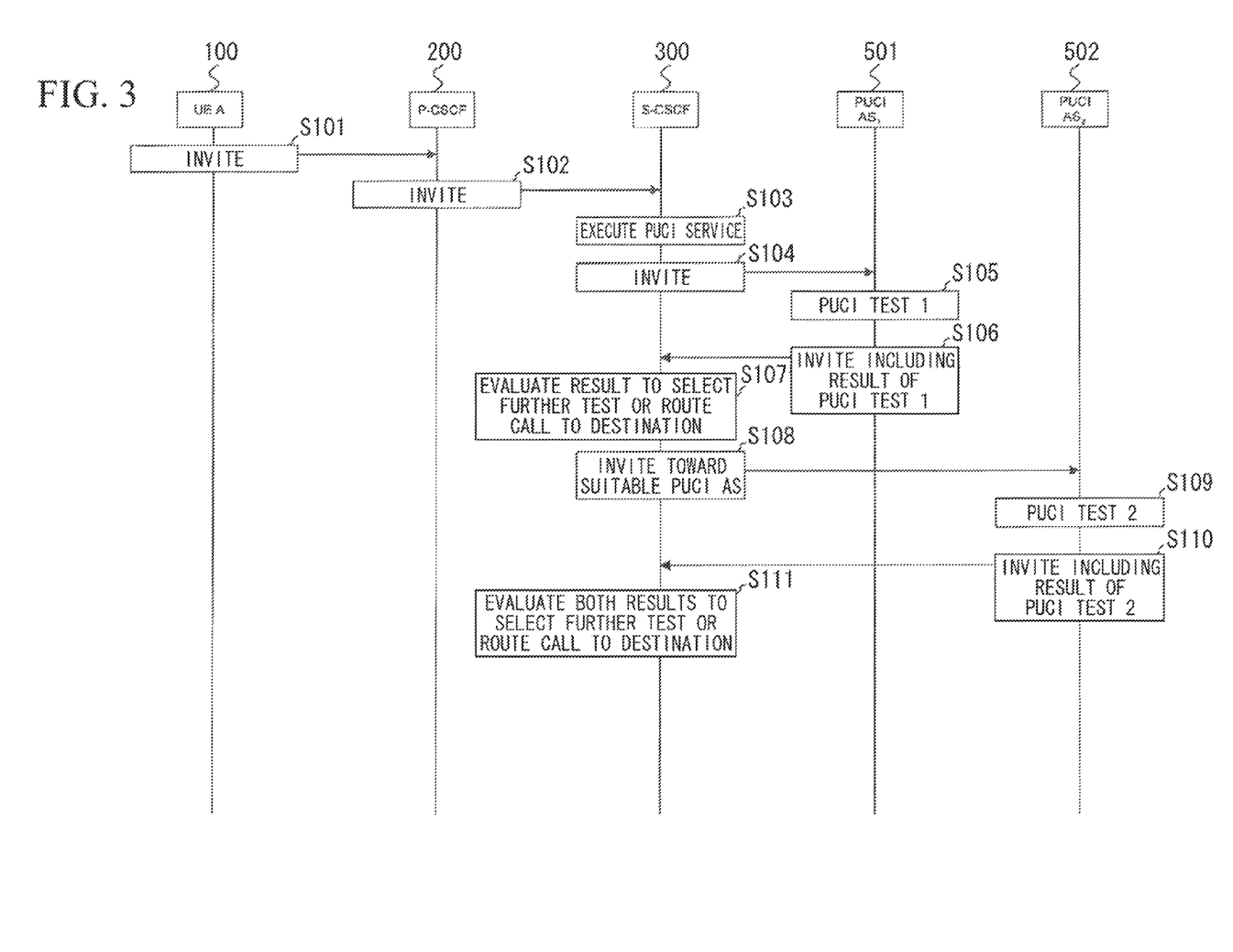
FIG. 3 is a sequential flow chart used for explaining the processing executed between user equipment, a proxy call session control function (P-CSCF), a serving call session control function (S-CSCF), and application servers (PUCI $AS_1$-$AS_2$) included in the PUCI system of FIG. 2.

FIG. 3 is a sequential flow chart used for explaining the processing executed between the user equipment 100, the P-CSCF 200, the S-CSCF 300, and the application servers (PUCI AS$_1$-AS$_2$) 501, 502 included in the PUCI system of FIG. 2.

Step S101: The A-party user equipment (UE A) 100 sends an INVITE for the B-party user equipment (UE B) 700 to the P-CSCS 200.

Step S102: The P-CSCF 200 determines the S-CSCF 300 so as to forward the INVITE thereto.

Step S103: The S-CSCF 300 triggers the iFC (initial filter criteria) so as to execute the PUCE service.

Step S104: The S-CSCF 300 forwards the INVITE to the application server (PUCI AS$_1$) 501 in light of the iFC.

Step S105: The application server 501 executes a PUCI Test 1 so as to produce a score rating the probability of the occurrence of an unsolicited call.

Step S106: The application server 501 incorporates the result of the PUCI Test 1 into a PUCI header of the INVITE, which is then sent back to the S-CSCF 300.

Step S107: The S-CSCF 300 evaluates the result of the PUCI Test 1, wherein when the score of the PUCI Test 1 indicates the probability of the unsolicited call, the S-CSCF 300 a certain application server suitable for the further testing. When the S-CSCF 300 receives the result of the PUCI Test 1 indicating the probability of a solicited call (which is not a unsolicited call), the S-CSCF 300 performs the normal call processing so that not further testing is performed. When the S-CSCF 300 detects an unsolicited call at a high probability, the S-CSCF 300 immediately rejects such an unsolicited call.

Step S108: When the S-CSCF 300 detects the need of the further testing, the S-CSCF 300 selects a certain application server suitable for the further testing, that is, it forwards the INVITE to the application server (PUCI AS$_2$) 502.

Step S109: The application server 502 performs a PUCI Test 2 so as to make a determination on the unsolicited call.

Step S110: The application server 502 sends the result of the PUCI Test 2 to the S-CSCF 300.

Step S111: The S-CSCF 300 evaluates both the result of the PUCI Test 1 and the result of the PUCI Test 2 so as to determine whether to deliver the call, whether to perform further testing, or whether to reject the call.

2. Embodiment 2 (or Solution 2 Implementing the Enhancement of the IMS/S-CSCF)

Figure 4:
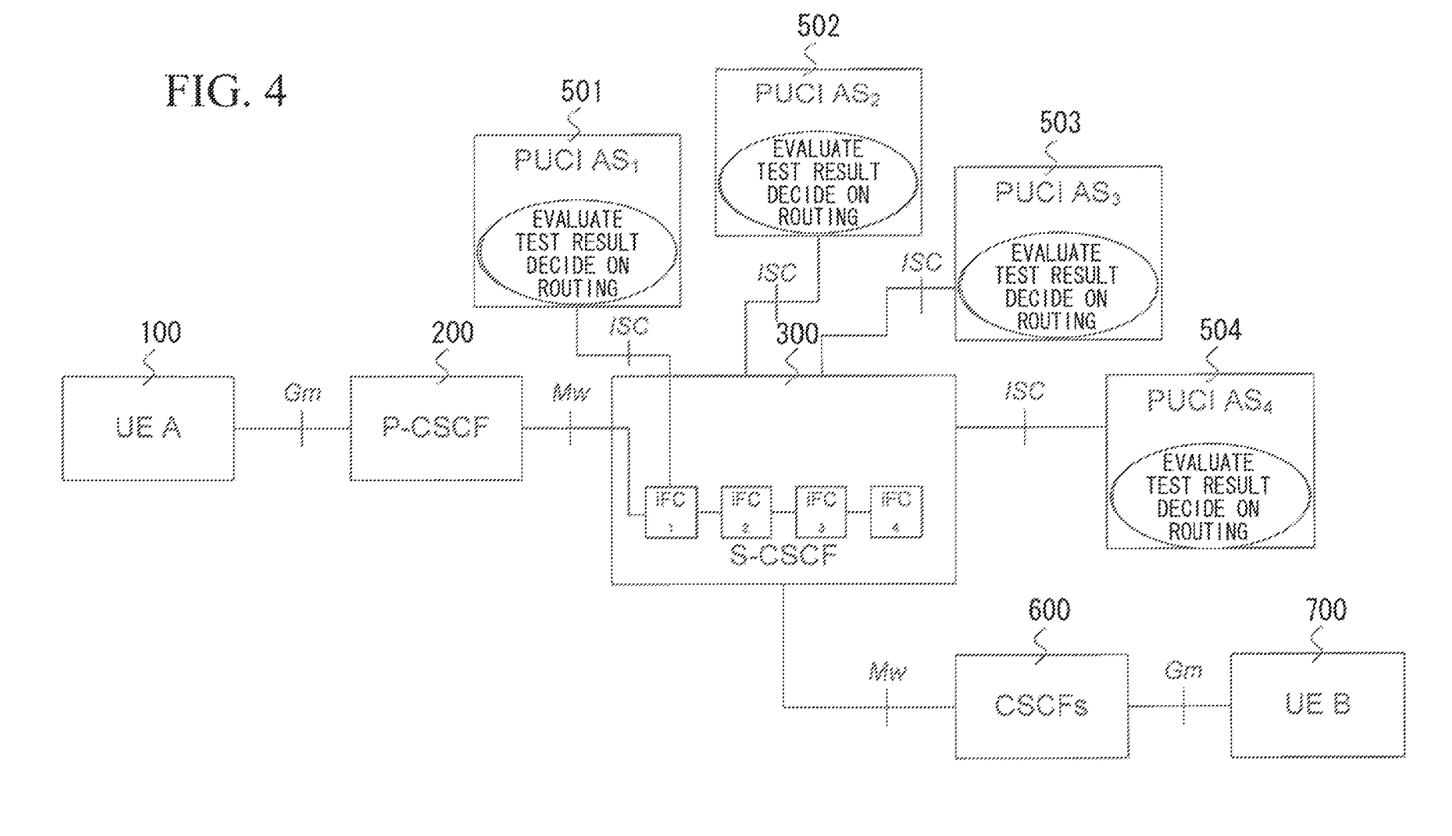
FIG. 4 is a block diagram showing the constitution of a PUCI system according to Embodiment 2.

FIG. 4 is a block diagram showing the constitution of a PUCI system according to Embodiment 2, which includes the user equipment (UE A) 100, the proxy call session control function (P-CSCF) 200, the serving call session control function (S-CSCF) 300, the application servers (PUCI AS$_1$ to PUCI AS$_4$), the call session control function (CSCF) 600, and the user equipment (UE B) 700.

Solution 2 implements a dynamic call routing capability as a part of each application server, which allows each application server to make an autonomous decision on the next PUCI application to be performed. A routing decision will be made based on the result of the PUCI application just performed as well as previous results of other PUCI applications previously performed. Previous results are provided to each application server in an in-band manner as a part of IMS/SIP signaling (i.e. PUCI specific header information).

In the above, the application server needs to act as a back-to-back user agent and to thereby change a request URI to the next desired application server for further testing. Herein, the application server includes the result of testing already executed in a special header record, so that the succeeding application server recognizes the testing already executed so as to take its information into consideration when another testing is required.

Figure 5:
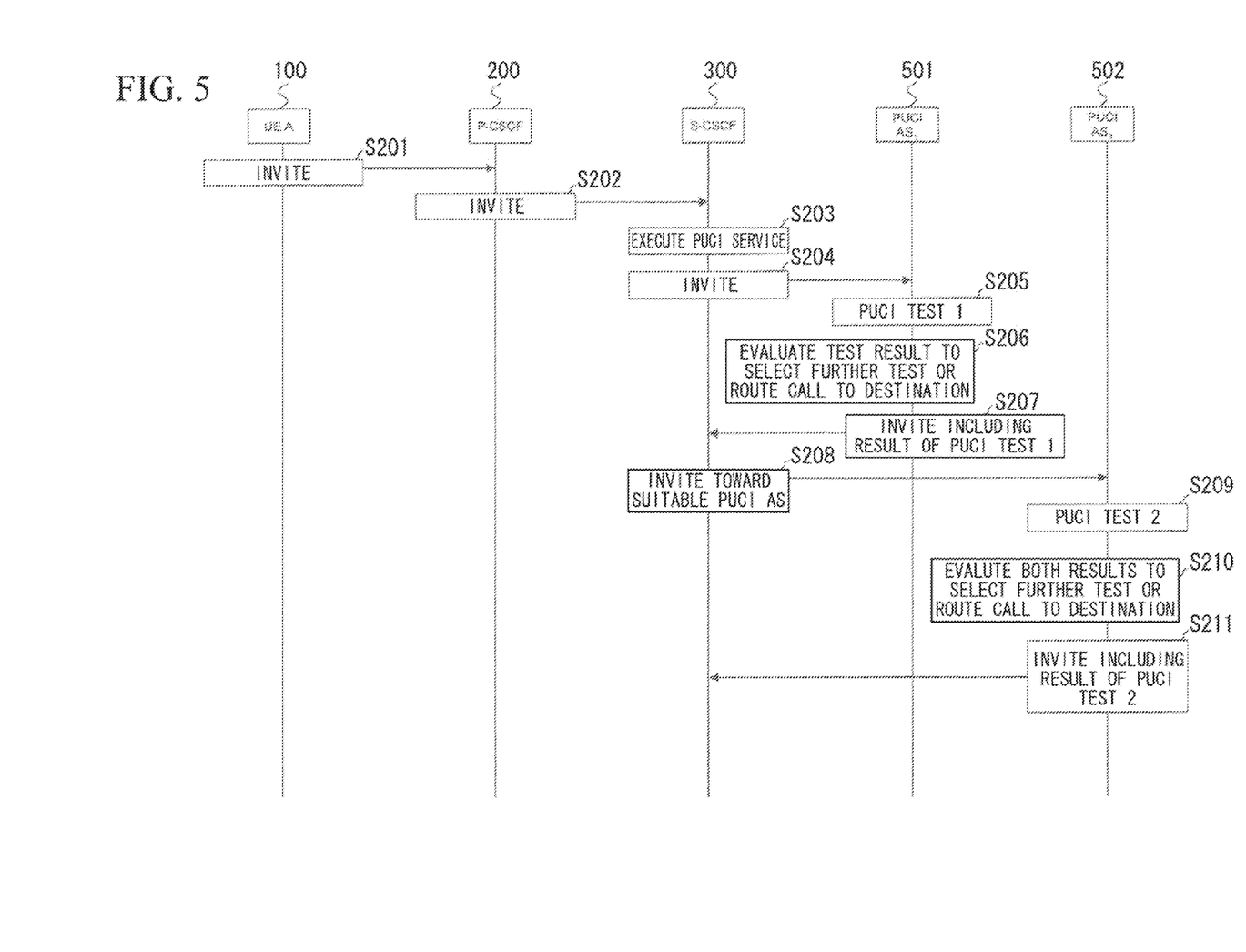
FIG. 5 is a sequential flow chart used for explaining the processing executed between the user equipment, P-CSCF, S-CSCF, and PUCI $AS_1$-$AS_2$ included in the PUCI system of FIG. 4.

FIG. 5 is a sequential flow chart used for explaining the processing executed between the user equipment (UE A) 100, the P-CSCF 200, the S-CSCF 300, the application servers (PUCI AS$_1$-AS$_2$) 501, 502 included in the PUCI system of FIG. 4.

Step S201: The A-party user equipment 100 sends an INVITE for the B-party user equipment 700 to the P-CSCF 200.

Step S202: The.P-CSCF 200 determines the S-CSCF 300 so as to forward the INVITE thereto.

Step S203: The S-CSCF 300 triggers the initial filter criteria (iFC) so as to execute the PUCI service.

Step S204: The S-CSCF 300 forwards the INVITE to the application server (PUCI. ASO 501 in light of the iFC.

Step S205: The application server 501 executes a PUCI Test 1 so as to produce a score rating the probability of the occurrence of an unsolicited call.

Step S206: The application server 501 evaluates the result of the PUCI Test 1, wherein when the result indicates the probability of the unsolicited call, the application server 501 determines a certain PUCI application server suitable for further testing. When the application server 501 receives the result indicating the probability of a solicited call (which is not an unsolicited call), it performs the normal call processing so that no further testing is performed. When the application server 501 detects an unsolicited call, it directly rejects such an unsolicited call.

Step S207: The application server 501 incorporates the result of the PUCI Test 1 (as well as its test information) in a PUCI header of the INVITE, which is then sent back to the S-CSCF 300 as the INVITE destined to the application server (PUCI AS$_2$) 502.

Step S208: The S-CSCF 300 sends the INVITE including the result and test information of the PUCI Test 1 to the application server (PUCI AS$_2$) 502.

Step S209: The application server 502 performs a PUCI Test 2 so as to make a further determination on the unsolicited call.

Step S210: The application server 502 evaluates both the result of the PUCI Test 1 and the result of the PUCI Test 2 so as to determine whether to deliver the call, whether to perform further testing, or whether to reject the call.

Step S211: In the case of the further testing, the application server 502 sends the INVITE including the result of the PUCI Test 2 to the S-CSCF 300. When the application server 502 detects an unsolicited call, it is unnecessary to deliver such an unsolicited call, which is thus routed to the terminating party.

As described above, the present embodiment is exemplarily involved in the following steps.

(1) The EMS has a dynamic routing capability to invoke a desired order of PUCI application servers.

(2) The IMS (S-CSCF) is enhanced to ensure dynamic routing toward special PUCE application servers based on the special PUCI information added to signaling messages (e.g. IMS/SIP headers) or by way of out-of-band signaling bet Ween the IMS (S-CSCF) and the PUCI application servers.

(3) The PUCI application server has a dynamic call routing capability based on the special information included in IMS/SIP signaling.

Lastly, the present invention is not necessarily limited to Embodiments 1 and 2, which can be further modified within the scope of the invention as defined by the appended claims.

The invention claimed is:

1. A PUCI (protection against unsolicited communication for internet protocol multimedia subsystem) system including:
a call session control function (CSCF) implementing a PUCI-aware routing logic; and
a plurality of PUCI application servers with a dynamic call routing function based on PUCI information included in a signaling message included in an IMS (an IP multimedia subsystem) header of a SIP message or a SIP (a signal initiated protocol) header of the SIP message,
wherein the CSCF causes each PUCI application server of the plurality of PUCI application servers, including a first PUCI application server, to perform an evaluation as to whether a received communication from a user equipment is regarded as an unsolicited communication,
wherein the CSCF determines routing toward a second PUCI application server selected from among the plurality of PUCI application servers in accordance with the PUCI-aware routing logic when the received communication is regarded as the unsolicited communication, and
wherein the evaluation as to the unsolicited communication is performed via each of the plurality of PUCI application servers until the CSCF is able to finalize the routing, thus dynamically chaining the plurality of PUCI application servers via the routing,
wherein the evaluation is performed using a two-staged PUCI testing process comprising:
forwarding an INVITE from the user equipment to the CSCF;
executing a PUCI service in the CSCF;
forwarding the INVITE in light of an initial filter criteria from the CSCF to the first PUCI application server;
executing a first PUCI test in the first PUCI application server, thus producing a first PUCI score indicating a probability of occurrence of an unsolicited call;
sending back the INVITE including the first PUCI score from the first PUCI application server to the CSCF;
evaluating the first PUCI score so as to forward the INVITE to the second PUCI application server subjected to a second PUCI test;
executing the second PUCI test in the second PUCI application server, thus producing a second PUCI score indicating a secondary probability of the occurrence of the unsolicited call;
sending back the INVITE including the second PUCI score from the second PUCI application server to the CSCF; and
evaluating the first PUCI score and the second PUCI score so as to reject the unsolicited call,
wherein comparison of a value of a test result from a previous application server to a threshold value results in the PUCI information as the test result, and resulting in selection of a new application server, based on one or more of an operator policy and a customer policy, the PUCI information indicating a probability of unsolicited communication.

2. The PUCI system according to claim 1, wherein each PUCI application server has a dynamic call routing capability based on special PUCI information included in the signaling message.

3. A dynamic call routing method for controlling a plurality of PUCI (protection against unsolicited communication for internet protocol multimedia subsystem) application servers, by way of a computer, according to a PUCI-aware routing logic comprising the steps of:
evaluating, by the computer, whether a received communication from a user equipment is regarded as an unsolicited communication;
determining, by the computer, routing toward a PUCI application server selected from among the plurality of PUCI application servers so as to produce a PUCI score indicating a probability of determining the received communication as the unsolicited communication,
wherein evaluation as to the unsolicited communication is performed in relation to any number of the plurality of PUCI application servers, in any order, until determination of the routing is able to be performed, wherein the evaluation is performed using a two-staged PUCI testing process comprising:

forwarding an INVITE from the user equipment to the CSCF;

executing a PUCI service in the CSCF;

forwarding the INVITE in light of an initial filter criteria from the CSCF to the first PUCI application server;

executing a first PUCI test in the first PUCI application server, thus producing a first PUCI score indicating a probability of occurrence of an unsolicited call;

evaluating the first PUCI score so as to determine the second PUCI application server subjected to a second PUCI test;

sending back the INVITE including the first PUCI score destined to the second PUCI application server from the first PUCI application server to the CSCF;

forwarding the INVITE to the second PUCI application server from the CSCF to the second PUCI application server;

executing the second PUCI test in the second PUCI application server, thus producing a second PUCI score indicating a secondary probability of the occurrence of the unsolicited call;

evaluating the second PUCI score so as to route the unsolicited call to a terminating party or to send back the INVITE including the first PUCI score negating the probability of the occurrence of the unsolicited call to the CSCF, wherein comparison of a value of a test result from a previous application server to a threshold value results in the PUCI information as the test result, and resulting in selection of a new application server, based on one or more of an operator policy and a customer policy, the PUCI information indicating a probability of unsolicited communication.

* * * * *